United States Patent [19]
Voges

[11] 3,774,133
[45] Nov. 20, 1973

[54] WORKHOLDING FIXTURE FOR MACHINE TOOLS

[76] Inventor: George A. Voges, 46 Florence Street, Springfield, Mass. 01105

[22] Filed: Sept. 27, 1971

[21] Appl. No.: 184,100

[52] U.S. Cl. .............................. 335/286, 335/287
[51] Int. Cl. .............................................. H01f 7/20
[58] Field of Search ................. 335/285, 286, 295, 335/302, 306; 269/8

[56] References Cited
UNITED STATES PATENTS
3,169,184 2/1965 Vye................................ 335/285 X
3,173,066 3/1965 Roode............................ 335/302 X
3,338,374 8/1967 Dudley........................... 335/306 X FOREIGN PATENTS OR APPLICATIONS
1,112,297 5/1968 Great Britain..................... 335/288

Primary Examiner—George Harris
Attorney—Alonzo L. Neal et al.

[57] ABSTRACT

A workholding fixture for machine tools in the form of a ferromagnetic chain composed of readily separable links and clamping means for retaining the chain in an endless loop within or without a workpiece of magnetic or nonmagnetic material.

3 Claims, 7 Drawing Figures

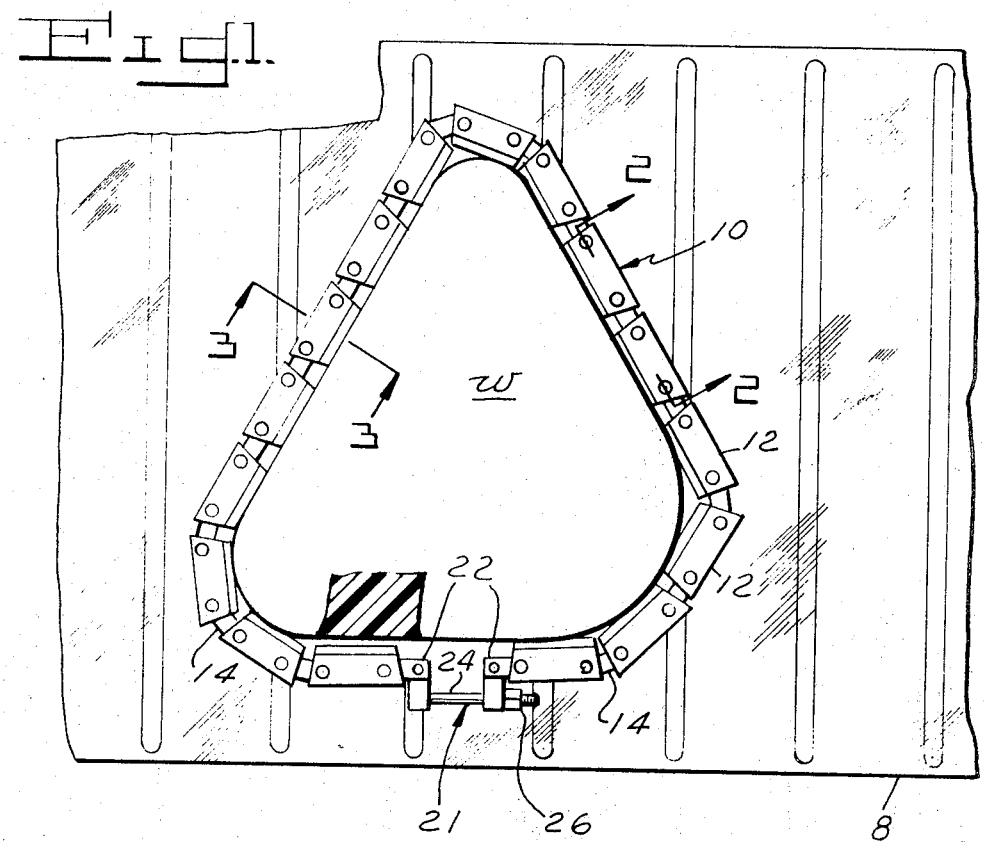
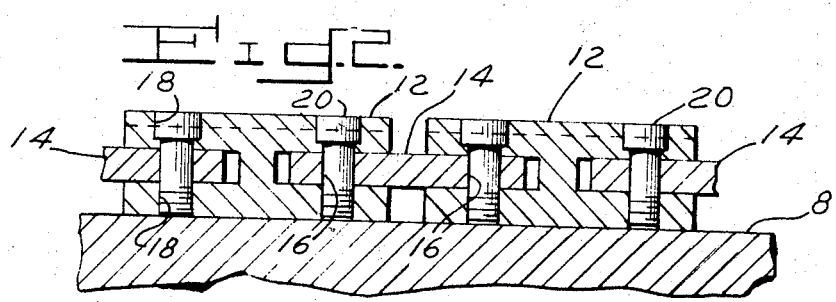
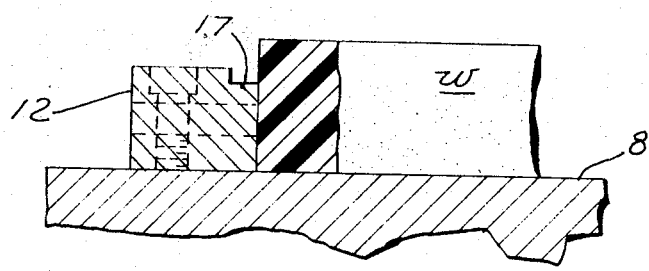
INVENTOR.
George A. Voges
BY Chapin, Neal & Dempsey
attorneys

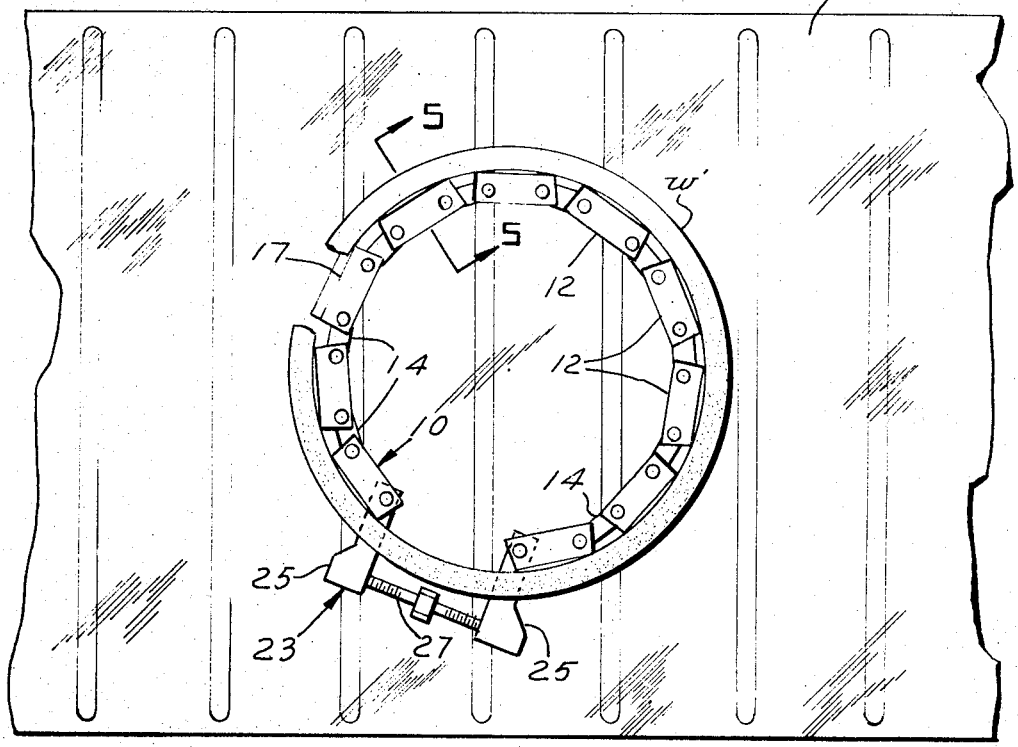
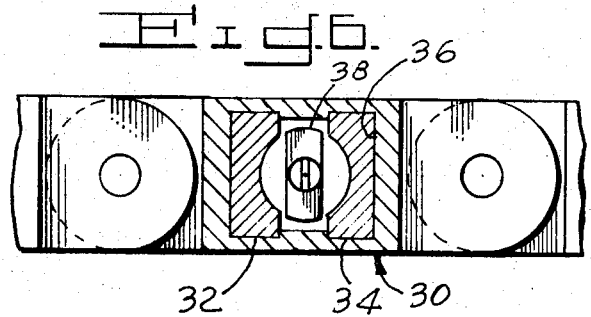
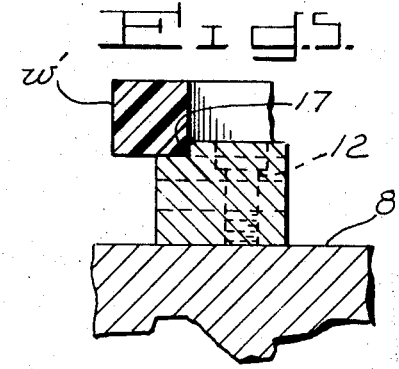
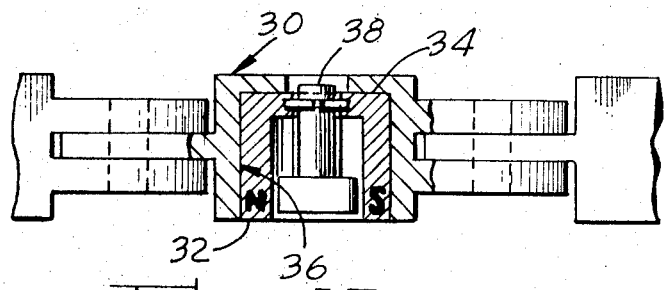

WORKHOLDING FIXTURE FOR MACHINE TOOLS

BACKGROUND

Machine tools such as precision surface grinders are generally equipped with a magnetic work surface or "magnetic chuck" by which any magnetic workpiece may be clamped for a machining operation. For nonmagnetic parts, a workholder is provided wherein a block containing ferromagnetic material is provided by which the nonmagnetic part is clamped and then secured in place by the magnetic chuck. A U.S. Pat. to Grage, No. 3,105,330, shows one suggested type of workholder for such grinding machines.

The principal object of this invention is to provide a simplified relatively inexpansive and universally adaptable workholder for grinding machines.

It is another object of this invention to provide such a workholder for surface grinders having a magnetic chuck.

A further object of this invention is to provide a workholder of the above type which is adaptable for use in grinding machines having a nonmagnetic chuck.

The above and other objects and advantages of this invention will be more readily apparent from the following description and with reference to the accompanying drawings, in which:

FIG. 1 is a plan view showing a workholder embodying this invention disposed about the periphery of a polygonal workpiece and in place on a magnetic chuck;

FIG. 2 is a section taken along line 2—2 of FIG. 1;

FIG. 3 is a section taken along line 3—3 of FIG. 1;

FIG. 4 is a plan view showing the workholder disposed internally of a ring-shaped workpiece;

FIG. 5 is a section taken along line 5—5 of FIG. 4;

FIG. 6 is a plan view partly in section of a magnetic link constituting an alternate embodiment of this invention; and FIG. 7 is an elevational view, partly in section, of the link shown in FIG. 6.

Referring now in detail to the drawings, in FIG. 1 the bench or workholding surface 8 of a grinding machine is of generally planar configuration for supporting various types of workpieces which have a surface which is to be machined to some suitable configuration. A grinding wheel, not shown, is disposed for operation directly above the work surface 8 and, as is well known, may be raised or lowered for machining the upper surface of a workpiece w supported on the planar work surface 8. It is common for the surface of the bench to be made of a magnetic material energizable electrically to hold ferrous parts in place during surface grinding.

In accordance with this invention, a workpiece w of any material may be held in place by a ferromagnetic link chain 10 formed by a plurality of individual, readily separable links 12. The several links forming the chain are connected together by means of connectors 14, as best shown in FIG. 2. Each connector is generally in the form of a rectangular bar with a hole 16 adjacent the opposite ends thereof.

Each link 12 is generally polygonal in configuration with a generally U-shaped recess opening outwardly at each end to receive the ends of the connectors 14. A hole 18 is provided through the vertically spaced arm portions adjacent each end of the links to receive bolts or pins 20 which also extend through the holes 16 in the connectors 14. As shown, each link is provided with a ledge or shoulder 17 along one of its upper edges so that when arranged with a plurality of other links in a loop will provide an annular work supporting surface as will hereinafter be explained. A sufficient number of links 12 may be joined together by connectors 14 to provide a workholder of sufficient length to envelope the periphery of a solid workpiece, as shown in FIG. 1. Alternatively, a number of links may be used to expand the chain into engagement with the interior of a ring-shaped or tubular type workpiece w', as shown in FIG. 4.

A coupling member, shown generally at 21 in FIG. 1 and 23 in FIG. 4, is provided for fine adjustment of the chain length to firmly clamp or tension the holder about the workpiece w or to expand it into the interior of a tubular workpiece w' so that the workpiece is tightly held about the linked workholder. As shown the coupling member 21 comprises a pair of links 22 connectible to the chain links by means of pins 20, and a threaded rod or bolt 24 which extends through holes in the outwardly extending portions of the links 22. As shown in FIG. 1, a nut 26 is provided which by rotation is used to make final adjustment to clamp the chain about a workpiece. The coupling member 23 (FIG. 4) includes connector links 25, a rod or bolt 27 threaded at its opposite ends and a polygonal flange or nut secured centrally thereof so that the rod 27 can be rotated to move the connector links 25 toward and away from each other to expand or reduce the peripheral size of the chain whereby it may be adjusted to fit snugly within a ring-like workpiece such as w'.

In the embodiment shown, the workpieces w and w' may be any material and may even be a nonmagnetic material which cannot alone be held by the magnetic chuck 8. The ferromagnetic chain 10 is adjusted first by incorporating the proper number of links to fit approximately the inner or outer circumferential contour of the workpiece and then the appropriate coupling member 21 or 23 as the case may be is taken up to grip tightly the outer or inner surface of a workpiece. The chain is then magnetically held by the magnetic chuck while its upper surface of the work is machined to any desired configuration.

In FIGS. 6 and 7 is shown a modified form of my invention for use with surface grinders not equipped with a "magnetic chuck." In this embodiment the individual links 30 are made of nonmagnetic material and have small permanent magnets 32, 34 mounted within a chamber 36 formed in each link. Of course, it will be readily appreciated that electromagnets could also be used for purposes of this invention. The lower ends of the two magnets are oppositely polarized as shown in FIG. 7 and a soft iron flux carrying armature 38 is rotatably supported within the chamber 36. The armature 38 is generally an inverted T-shaped member with its laterally extending cross portion being axially disposed adjacent the lower ends of the magnets 32 and 34. As shown, the stem portion of the armature is provided with a drive slot for receiving the tip of a screwdriver used to rotate the armature. When the armature is positioned as shown in FIG. 6, the flux path from the North to South poles of the magnets 32 and 34 is completed through the ferrous surface of the grinding machine. When the armature 38 is rotated to the position shown in FIG. 7, the flux is shunted through the cross portion of the armature and the link released from the working surface of the grinding machine.

Having thus described the invention, what is claimed is:

1. Workholding fixture for machine tools comprising a plurality of links, means separably interconnecting said links into an articulated chain, clamping means for retaining said chain in an endless loop about the periphery of a workpiece, said links being formed of ferromagnetic material and said clamping means being adjustable so that the circumference of the endless loop formed by said chain is variable to tightly grip the peripheral surface of a workpiece.

2. Workholding fixture for machine tools comprising a plurality of links, means separably interconnecting said links into an articulated chain, clamping means for retaining said chain in an endless loop about the periphery of a workpiece, said links formed of a nonmagnetic material and contain oppositely poled magnets and a flux carrying armature movable selectively to short the flux path between the opposite poles of said magnets and to another position in which said flux path is completed through the ferrous upper surface of a grinding machine.

3. Workholding fixture for machine tools as set forth in claim 1, in which each of said links is generally polygonal in configuration with a planar undersurface, each of said links being provided with a shoulder formed along on of its upper edges whereby said endless loop provides an annular work supporting surface.

* * * * *